United States Patent [19]
Steele et al.

[11] Patent Number: 5,922,389
[45] Date of Patent: Jul. 13, 1999

[54] METHOD OF TREATING WOOD FOR USE WITH ALCOHOLIC BEVERAGES

[75] Inventors: Gordon Mark Steele; Kenneth John Gibson Reid; Andrew Frank Ward, all of East Lothian, United Kingdom

[73] Assignee: The Scotch Whisky Research Institute, Edinburgh, United Kingdom

[21] Appl. No.: 08/945,702

[22] PCT Filed: Mar. 15, 1996

[86] PCT No.: PCT/GB96/00604

§ 371 Date: Feb. 9, 1998

§ 102(e) Date: Feb. 9, 1998

[87] PCT Pub. No.: WO96/34939

PCT Pub. Date: Nov. 7, 1996

[30]     Foreign Application Priority Data

Apr. 29, 1995 [GB] United Kingdom ............... 9508765

[51] Int. Cl.⁶ .............. C12C 1/00; C12F 1/00; A21D 10/02; C12G 2/40
[52] U.S. Cl. .............. 426/592; 99/277.1; 99/276; 426/132; 426/262; 426/420
[58] Field of Search .................... 99/276, 278, 277.1; 217/76, 72, 88; 426/132, 133, 262, 592, 420, 422

[56]         References Cited

U.S. PATENT DOCUMENTS 2,080,138   5/1937   Krebs ............................. 99/48

5,102,675   4/1992   Howell et al. ................. 426/422

FOREIGN PATENT DOCUMENTS 0634108   1/1995   European Pat. Off. .
428518    5/1935   United Kingdom .

OTHER PUBLICATIONS

Chemical Abstracts, vol. 66, No. 17, Apr. 24, 1976, Abstract No. 74929u, I.M. Skurikhin, Treatment of Oakwood with Heat, Acids and Alkalies for Storage of Cognacs.

Journal of the Science of Food and Agriculture, vol. 59, No. 4, 1992, pp. 477–482, Pigott et al., "The Influence of Non–Volatile Constituents on the Extraction of Ethyl Esters from Brandies".

Kenneth Kilby, The Cooper and His Trade Linden Publishing Co. Inc. Fresno CA 93726 p. 77, 1971.

*Primary Examiner*—David Lacey
*Assistant Examiner*—Drew Becker
*Attorney, Agent, or Firm*—Ratner & Prestia

[57]            ABSTRACT

A cask for storing alcoholic beverage is made of a pre-treated wooden material, such as oak wood, wherein the method of pre-treatment includes soaking the wood in a salt solution and heating or toasting the wood thereafter to produce a color change in the wood. Is has been found that impregnating the wood with salt extracts is beneficial in respect of flavoring and coloring the alcoholic beverage.

8 Claims, No Drawings

METHOD OF TREATING WOOD FOR USE WITH ALCOHOLIC BEVERAGES

This invention relates to a method for treating cask oak wood or other wood products used to enhance the flavour of alcoholic beverage and furthermore to provide colour improvement of such beverage.

Traditionally oak has been used for the manufacture of casks for storing alcoholic beverages, such as spirits and wines. The casks are made from shaped oak wood blocks which may be heat treated to provide particular flavouring and colour characteristics to the beverage which is to be held in the cask. In addition other oak wood products, for example, oak blocks, shavings or extracts have been added to alcoholic beverages to provide particular flavour or colour characteristics.

It has been known to treat the oak with metal salts, particularly for the purpose of providing tire retardants.

An object of the present invention, however, is to use salt and simple organic compound solutions for the purposes of providing flavour and colour to the alcoholic beverage.

According to the invention there is provided a cask for containing alcoholic beverages, the cask being made from wood which has been impregnated with a salt or compound solution.

Preferably, the wood is oak. The oak may be provided in the form of wooden blocks which may be soaked in the solution.

Preferably also of the wood blocks are heat treated after their soaking in the solution.

Also according to the invention there is provided oak wood impregnated with salt extracts for storing, flavouring or colouring alcoholic beverages.

According to a further aspect of the invention there is provided a method of manufacturing casks for containing alcoholic beverages, the method including the steps of:
a) soaking wood blocks for a period, the length of which is dependant on the degree of colour and flavour change required; and
b) heat treating the wood blocks for a period and at a temperature which will develop the required colour and flavour.

Also according to the invention the above method may be used in respect of oak wood products used for flavour or colouring alcoholic beverages (e.g. wood shavings, oak blocks or oak extracts).

In order to assist the reader in performing the invention, the following example is given. That is, oak wood may be soaked overnight in a solution of a compound or a solution of a mixture of compounds, in accordance with the invention. By way of example only, the following compounds may be used; calcium chloride, magnesium sulphate, potassium dihydrogen phosphate, dipotassium hydrogen phosphate, urea, sodium chloride, potassium chloride, magnesium chloride, iron chloride, sodium sulphate, zinc sulphate, sodium dihydrogen phosphate, disodium hydrogen phosphate and glycine.

After the oak wood have been soaked in the solution, it may be toasted at 190° C. for 60 minutes. It is preferable although not essential that the toasting of the wood takes place after the soaking process. Similarly, the temperature and time of the toasting process should be similar to that which would be found in a cooperage.

Experiments have been conducted using this process in respect of various solutions and the results of the experiment may be seen from the attached table. In the experiment the surface of the blocks were removed to a depth of 3 mm and an ethanol/water extract was made of the wood flour. These extracts were presented blind to a sensory panel of 7 people for assessment. They scored the extracts for a flavour aroma (the scores being from 0 to 3) and the main scores are presented in the table attached. Colour of the extracts (at 60% v/v ethanol) were measured with a spectrophotometer at 430 nm.

It may be seen from the attached table that large differences between the controls (the untreated and heat treated only rows) were observed in respect of both flavour profiles and colour intensity. This is true whether individual compounds in the treatments were employed or where, alternatively, a mixture was employed.

It may also be seen from the experiment described above that the use of different salts and solutions may be selected to achieve a desired and predetermined result in respect of colour and flavour. Various flavour aromas may be achieved depending on the choice of solution and thus the invention may be used for a wide variety of alcoholic spirits and wines.

The invention provides considerable commercial advantages over processes known herebefore. For example, in some whiskies and other beverages it is very desirable to darken the colour. Previously, this may have been achieved by adding colouring, such as caramel which may be associated with undesirable taste characteristics. The present invention is advantageous over such a process in that it does not require an additive to be provided directly to the beverage itself.

Furthermore, the invention is suitable where casks are regenerated. A cask which has been previously used to contain alcoholic beverage may, after use, be shaved, treated (e.g. soaked in a solution) and heat treated. Treatment of a pre-used cask may be simply by filling the cask with a desired salt solution and leaving it to rest for a pre-determined period, such as overnight.

Further modifications may be incorporated without departing from the scope of the invention herein intended.

| | Wood Treatments | | | | | | | | |
| --- | --- | --- | --- | --- | --- | --- | --- | --- | --- |
| | Mean scores of flavour aromas | | | | | | | | Colour |
| Compound/toast | TIA | Burnt sugar | Burnt wood | Vanilla | Buttery | Coconut | Woody | Spicey | (EBC units)** |
| Untreated/untoasted | 1.5 | 0.8 | 0.3 | 0.7 | 0.4 | 0.3 | 1.5 | 0.4 | 30.3 |
| MgSO$_4$/190° C., 60 mins. | 1.6 | 1.0 | 0.6 | 0.6 | 0.8 | 0.0 | 1.0 | 0.5 | 41.3 |
| Untreated/190° C., 60 mins. | 2.0 | 1.5 | 0.9 | 0.6 | 0.3 | 0.0 | 1.4 | 0.1 | 42.8 |
| KH$_2$PO$_4$/190° C., 60 mins. | 1.8 | 1.3 | 0.8 | 1.4 | 0.5 | 0.0 | 0.6 | 0.9 | 45.9 |
| Mix*/190° C.,60 mins. | 1.5 | 1.0 | 0.6 | 1.3 | 0.3 | 0.1 | 1.6 | 0.6 | 51.4 |
| CaCl$_2$/190° C., 60 mins. | 2.4 | 2.3 | 1.1 | 1.8 | 0.4 | 0.3 | 0.5 | 0.5 | 67.6 |

-continued

Wood Treatments

| | Mean scores of flavour aromas | | | | | | | | Colour |
|---|---|---|---|---|---|---|---|---|---|
| Compound/toast | TIA | Burnt sugar | Burnt wood | Vanilla | Buttery | Coconut | Woody | Spicey | (EBC units)** |
| Urea(CH$_4$N$_2$O)/190° C., 60 mins. | 2.1 | 1.0 | 1.5 | 0.9 | 0.3 | 0.5 | 0.3 | 0.5 | 71.3 |
| K$_2$HPO$_4$/190° C., 60 mins. | 1.4 | 1.3 | 1.3 | 1.0 | 0.5 | 0.0 | 0.8 | 0.6 | 83.1 |

*Mix: MgSO$_4$
KH$_2$PO$_4$
CaCl$_2$
Urea
K$_2$HPO$_4$
**EBC units: European Brewery Convention - units read at 430 nm on a spectrophotometer, multiplied by 25.

We claim:

1. A wood product for enhancing the flavor and color of alcoholic beverages, the wood product being made from wood which has been impregnated with a salt solution and then heat treated to cause a color change in the wood and add flavors thereto.

2. A wood product according to claim 1, wherein the wood is oak.

3. A wood product according to claim 1, wherein the heat treatment is comprised of toasting.

4. A wood product according to claim 1, wherein the wood product is a cask for containing alcoholic beverages.

5. A wood product according to claim 1, wherein the wood product is in the form of oak wood shavings.

6. A method of treating wood for use in manufacturing casks for containing alcoholic beverages, the method including the steps of:

a) soaking wood blocks in a salt solution for a period of time so as to impregnate said wood blocks with said salt solution, the length of said period of time being dependent on the degree of color and flavor change required in the alcoholic beverage; and b) subsequently heat treating said wood blocks to cause a color change in said wood blocks for a period of time and at a temperature which will develop the required degree of color and flavor change in the alcoholic beverage.

7. A method according to claim 6, wherein the wood blocks are oak.

8. A method according to claim 6, wherein the heat treating is comprised of toasting.

* * * * *